Patented Feb. 21, 1950

2,498,371

UNITED STATES PATENT OFFICE 2,498,371

METHOD FOR PREPARING ALKYLIDENE-SUCCINIC ESTERS

Milton C. Kloetzel, Los Angeles, Calif., assignor to Commercial Solvents Corporation, Terre Haute, Ind., a corporation of Maryland No Drawing. Application December 18, 1947, Serial No. 792,602

6 Claims. (Cl. 260—485)

My invention relates to a new and useful process for the production of alkylidenesuccinic esters having the following structural formula:

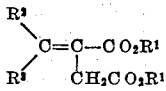

in which $R^1$ represents a lower alkyl radical, and $R^2$ and $R^3$ are selected from the group consisting of hydrogen and alkyl groups.

Examples of alkylidenesuccinic esters coming within the scope of the above formula include the following: dimethyl itaconate, dimethyl ethylidenesuccinate, dimethyl n-propylidenesuccinate, dimethyl teraconate, diethyl itaconate, diethyl ethylidenesuccinate, diethyl n-propylidenesuccinate and diethyl teraconate.

Prior investigators in this field found that primary and secondary nitroalkanes would add to alpha, beta-unsaturated carbonyl compounds by means of the action of sodium amide, sodium alkoxides and other strongly basic materials. I have attempted the same reaction using a secondary amine such as diethylamine, but with entirely surprising results. I have found that if one mole of ester is employed to three moles of nitroalkanes and two-tenths of a mole of diethylamine, it is possible to obtain a good yield of nitro ester. However, if one mole of ester is used to three moles of nitroalkanes and at least one mole of dialkylamine, the reaction product is not a nitro ester but rather, an alkylidenesuccinic ester. This unusual product may be explained by the loss of the elements of nitrous acid from the originally formed nitroester.

The preparation of either the nitroesters or the alkylidenesuccinic esters by the above described method is preferably effected at temperatures of about 20–30° C.

The esters which may be employed in my new process are represented by the following formula:

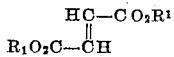

wherein $R^1$ represents a lower alkyl group (i. e. having 6 or less carbon atoms). As examples of such esters, there may be mentioned dimethyl fumarate, diethyl fumarate, dimethyl maleate, and diethyl maleate. When maleic esters are used in this process they first rearrange to the respective fumaric acid esters in the presence of the secondary amine catalyst.

The nitroalkanes which are operative in my process may be represented by the following formula:

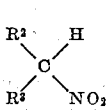

wherein $R^2$ and $R^3$ are selected from the group consisting of hydrogen and alkyl groups. Nitroalkanes typical of this class include nitromethane, nitroethane, 2-nitropropane, 1-nitropropane, 2-nitrobutane, 1-nitrobutane, 2-nitropentane, and the like.

The examples which follow are illustrative of the procedures by which alkylidenesuccinic esters may be synthesized by my new process. It is to be specifically understood, however, that these examples in no way limit the scope of my invention, since I have found that the reaction involved is very general in nature, and will occur, under the conditions described in the reaction of substantially any primary or secondary nitroalkanes with an alkyl ester of fumaric or maleic ester under the influence of the secondary amine used.

EXAMPLE I

A mixture of dimethyl or diethyl fumarate (1 mole), the nitroalkane (3 moles) and diethylamine (1–1.1 mole) was allowed to stand at 20–30° C. in a stoppered flask. When dimethyl fumarate was employed, the suspension was swirled frequently until all of the ester had dissolved (several hours). In most instances the mixture became warm from heat of reaction.

After standing for an appropriate period (see Table I) the colored solution (orange to red) was subjected to reduced pressure distillation (40° C. at 12 mm.) to remove diethylamine, nitroalkane and water. Fractionation of the residue, employing a ten-inch Vigreux column, yielded yellow N-nitrosodiethylamine (B. P. 72–75° C. at 12 mm.) followed by the higher-boiling alkylidenesuccinic ester. Removal of traces of basic impurities from the esters was effected by extraction with 10% hydrochloric acid. A final vacuum distillation yielded pure products with properties shown in Table I.

The N-nitrosodiethylamine produced in these reactions was identified by conversion to diethylammonium chloride by means of anhydrous hydrogen chloride. The chloride separated from anhydrous ethanol-ether in large, colorless, transparent plates; M. P. 222–223° C.

This general reaction was used to prepare the compounds listed in Table I.

TABLE I

*Alkylidenesuccinic esters from condensation of nitroalkane (3 moles) with fumarates (1 mole) at 30° in presence of diethylamine (1–1.1 moles)*

| Fumarate | Nitroalkane | Product | Reaction Time, Days | Yield, Per Cent | B. P. °C. (mm.) | $n_D^{20}$ | $d_{20}^{20}$ |
|---|---|---|---|---|---|---|---|
| Dimethyl | Nitromethane | Dimethyl itaconate | 5 | [1] 22–43 | 56–58/1.25 | [2] 1.4457 | 1.1246 |
| Do | Nitroethane | Dimethyl ethylidene-succinate | 6 | 77 | 73–74/1.5 | 1.4553 | 1.1058 |
| Do | 1-Nitropropane | Dimethyl n-propylidene-succinate | 14 | 86 | 78.5–80/1.25 | 1.4555 | 1.0746 |
| Do | 2-Nitropropane | Dimethyl teraconate | 14 | [3] 85 | 77–78/1.5 | 1.4581 | 1.0788 |
| Diethyl | Nitromethane | Diethyl itaconate | 11 | 45 | 68–69/1.25 | [4] 1.4398 | 1.0459 |
| Do | Nitroethane | Diethyl ethylidene-succinate | 11 | 88 | 82/1.25 | 1.4484 | 1.0437 |
| Do | 1-Nitropropane | Diethyl n-propylidene-succinate | 10 | 95 | 88–90/1.25 | 1.4491 | 1.0171 |
| Do | 2-Nitropropane | Diethyl teraconate | 18 | 83 | 87/1.25 | 1.4537 | 1.0261 |

[1] Viscous polymer of the itaconate also obtained, thereby accounting for the low yield of pure ester.
[2] Knops, Ann., 248, 200 (1888) reported 1.444125.
[3] There was also obtained 11% of methyl (1-nitroisopropyl)-succinate B. P. 135–137° at 2.5 mm.
[4] Knops, Ann., 248, 201 (1888) reported $n_D^{20}$ 1.438762.

The alkylidenesuccinic esters of my invention are useful as intermediates in the preparation of numerous organic compounds. Other uses of these products will readily occur to those skilled in the art.

Now having described my invention, what I claim is:

1. In the process for the preparation of alkylidenesuccinic esters of the formula

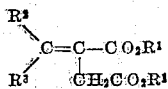

wherein $R^1$ represents a lower alkyl radical, $R^2$ and $R^3$ are selected from the group consisting of hydrogen and alkyl groups, the step which comprises causing a reaction between an ester having the formula

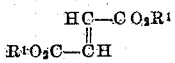

wherein $R^1$ represents a lower alkyl radical, and a nitroalkane of the formula

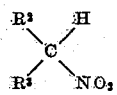

wherein $R^2$ and $R^3$ are selected from the group consisting of hydrogen and alkyl groups, by means of a dialkylamine, said dialkylamine being used in the proportion of at least one mole per mole of ester and three moles of nitroalkane.

2. The process of claim 1 wherein one mole of the ester is reacted with three moles of the nitroalkane in the presence of at least one mole of dialkylamine.

3. The process of claim 1 wherein the amine is diethylamine.

4. In a process for the preparation of dimethyl n-propylidenesuccinate, the step which comprises causing dimethyl fumarate and 1-nitropropane, in the proportion of one mole of dimethyl fumarate to three moles of 1-nitropropane, to react in the presence of at least one mole of diethylamine at a temperature of about 20°–30° C.

5. In a process for the preparation of dimethyl teraconate, the step which comprises causing dimethyl maleate and 2-nitropropane, in the proportion of one mole of dimethyl maleate to three moles of 2-nitropropane, to react in the presence of at least one mole of diethylamine at a temperature of about 20°–30° C.

6. In a process for the preparation of diethyl ethylidenesuccinate, the step which comprises causing diethyl fumarate and nitroethane, in the proportion of one mole of diethyl fumarate to three moles of nitroethane, to react in the presence of at least one mole of diethylamine at a temperature of about 20°–30° C.

MILTON C. KLOETZEL.

REFERENCES CITED

The following references are of record in the file of this patent:

UNITED STATES PATENTS

| Number | Name | Date |
|---|---|---|
| 2,342,119 | Bruson | Feb. 22, 1944 |
| 2,390,918 | Bruson | Dec. 11, 1945 |